(12) United States Patent
Murree et al.

(10) Patent No.: US 9,027,284 B2
(45) Date of Paten­t: May 12, 2015

(54) SEALING MEMBER

(71) Applicant: Henniges Automotive Sealing Systems North America, Inc., Dover, DE (US)

(72) Inventors: Steve J. Murree, Macomb, MI (US); Michael J. Lagerstrom, Bingham Farms, MI (US)

(73) Assignee: Henniges Automotive Sealing Systems North America, Inc., Dover, DE (US)

( * ) Notice: Subject to any disclaimer, the term of this patent is extended or adjusted under 35 U.S.C. 154(b) by 0 days.

(21) Appl. No.: 13/894,932

(22) Filed: May 15, 2013

(65) Prior Publication Data

US 2013/0305612 A1 Nov. 21, 2013

(51) Int. Cl.
*E06B 7/16* (2006.01)
*E06B 7/23* (2006.01)
*B29C 47/06* (2006.01)
(Continued)

(52) U.S. Cl.
CPC .............. *E06B 7/2314* (2013.01); *B29C 47/06* (2013.01); *B60J 10/0005* (2013.01); *B60J 10/0011* (2013.01); *B60J 10/0051* (2013.01); *B60J 10/0065* (2013.01); *B60J 10/042* (2013.01); *B60J 10/086* (2013.01); *B29L 2031/302* (2013.01); *B29C 47/0007* (2013.01); *B29C 47/003* (2013.01); *B29C 47/0038* (2013.01)
USPC .............. 49/495.1; 49/490.1; 49/441; 49/506

(58) Field of Classification Search
CPC ............................. E06B 7/2314; B29C 47/06
USPC ......... 49/440, 441, 498.1, 475.1, 490.1, 49.1, 49/490.15, 495.1; 428/122
See application file for complete search history.

(56) References Cited

U.S. PATENT DOCUMENTS

| 5,085,005 A | 2/1992 | Yasukawa et al. |
| 5,317,835 A | 6/1994 | Dupuy et al. |

(Continued)

FOREIGN PATENT DOCUMENTS

| DE | 102006060390 B3 | 2/2008 |
| EP | 0385028 A1 | 9/1990 |
| GB | 2393752 A | 4/2004 |

OTHER PUBLICATIONS

Certified English translation of DE 10 2006 060 390 B3 with attached certification dated Feb. 3, 2015, 9 pages.

(Continued)

*Primary Examiner* — Jerry Redman
(74) *Attorney, Agent, or Firm* — Howard & Howard Attorneys PLLC (57) ABSTRACT

A sealing member for a vehicle opening includes a first co-extrusion layer formed from a first elastomeric composition, a second co-extrusion layer formed from a second elastomeric composition, and a third co-extrusion layer formed from a thermoplastic vulcanizate composition. The first co-extrusion layer defines a mounting channel, a window channel, and a front face spaced from the mounting channel and the window channel. The second co-extrusion layer has a portion disposed on the front face of the first co-extrusion layer and a sealing lip disposed on the first co-extrusion layer abutting the portion and extending away from the first co-extrusion layer towards a distal end. The third co-extrusion layer is disposed on the portion and the sealing lip of the second co-extrusion layer for covering segments of the second co-extrusion layer that are visible from an exterior of the vehicle.

30 Claims, 5 Drawing Sheets

(51) Int. Cl.
*B60J 10/00* (2006.01)
*B60J 10/04* (2006.01)
*B60J 10/08* (2006.01)
B29L 31/30 (2006.01)
B29C 47/00 (2006.01)

(56) References Cited

U.S. PATENT DOCUMENTS

| | | | |
|---|---|---|---|
| 5,411,785 | A | 5/1995 | Cook |
| 5,415,822 | A | 5/1995 | Cook |
| 5,628,150 | A | 5/1997 | Mesnel |
| 5,736,215 | A | 4/1998 | Buchholz et al. |
| 5,806,914 | A | 9/1998 | Okada |
| 6,301,834 | B1 | 10/2001 | Tyves |
| 6,514,604 | B2 | 2/2003 | Gopalan et al. |
| 6,817,651 | B2 | 11/2004 | Carvalho et al. |
| 6,848,218 | B2 | 2/2005 | Langemann |
| 6,896,954 | B2 * | 5/2005 | Omori et al. ............... 428/304.4 |
| 7,543,881 | B2 * | 6/2009 | Okajima et al. ........... 296/146.9 |
| 7,763,197 | B2 | 7/2010 | Ellis et al. |
| 8,051,606 | B2 | 11/2011 | Maass et al. |
| 8,225,554 | B2 * | 7/2012 | Nozaki ....................... 49/498.1 |
| 8,661,736 | B2 * | 3/2014 | Roll et al. ...................... 49/441 |
| 2005/0084629 | A1 | 4/2005 | Gopalan |
| 2005/0112301 | A1 * | 5/2005 | Omori et al. ................... 428/31 |
| 2006/0000181 | A1 | 1/2006 | Zwolinski et al. |
| 2006/0086053 | A1 * | 4/2006 | Ellis ............................... 49/441 |
| 2006/0279046 | A1 | 12/2006 | Vogt et al. |
| 2010/0095600 | A1 | 4/2010 | Gagnon et al. |
| 2011/0143113 | A1 * | 6/2011 | Hatta et al. .................. 428/217 |
| 2014/0145374 | A1 * | 5/2014 | Altonen et al. .......... 264/328.14 |

OTHER PUBLICATIONS

European Search Report from corresponding European Patent Application EP 14168411.8 mailed Dec. 19, 2014, 3 pages.

* cited by examiner

SEALING MEMBER

BACKGROUND OF THE INVENTION

1. Field of the Invention

The subject invention generally relates to a window seal assembly for a motor vehicle. More specifically, the invention relates to a sealing member of the window seal assembly.

2. Description of the Prior Art

Various window seal assemblies for motor vehicles are known in the art. These assemblies typically include multiple sealing members such as a header profile, post profiles, an outer belt profile, and molds (corner and end molds). Window seal assemblies must provide a robust weatherseal and enhance vehicle acoustics. In order provide a robust weatherseal and enhance vehicle acoustics, suppliers have designed complex, multi-material header profiles and other window seal members. The materials used to form such window seal members are typically elastomeric materials which can fade and/or discolor and even leach out oil and other chemicals over time and exposure to various environmental conditions. As such, although functional, these prior art window seal members are not always aesthetically pleasing, e.g., do not provide a uniform appearance when viewed from an exterior of the vehicle and/or do not maintain a uniform appearance over time.

Accordingly, manufacturers of window seal assemblies and the sealing members thereof go through great lengths to assure that their window seal assemblies and the window seal members thereof provide a uniform appearance when viewed from an exterior of the vehicle. For example, manufacturers have designed window seal members which are manufactured, typically by an extrusion and/or molding process and, once formed, each particular window seal member, such as a header profile, is spray coated with a composition that provides a uniform appearance when viewed from an exterior of the vehicle. Such spray processes require significant capital investment, additional process and drying time, and can only be applied in minimal thicknesses unless coated multiple times.

Accordingly, there exists a need for window seal assemblies and window seal members thereof that are economical to produce, provide a robust weatherseal, enhance vehicle acoustics, are aesthetically pleasing and do not fade or discolor over time and upon exposure to various environmental conditions.

SUMMARY OF THE INVENTION AND ADVANTAGES

The subject invention provides sealing member for a vehicle opening. The sealing member includes a first co-extrusion layer formed from a first elastomeric composition, a second co-extrusion layer formed from a second elastomeric composition, and a third co-extrusion layer formed from a thermoplastic vulcanizate composition. The first co-extrusion layer defines a mounting channel, a window channel, and a front face spaced from the mounting channel and the window channel. The second co-extrusion layer has a portion disposed on the front face of the first co-extrusion layer and a sealing lip disposed on the first co-extrusion layer abutting the portion and extending away from the first co-extrusion layer towards a distal end. The third co-extrusion layer is disposed on the portion and the sealing lip of the second co-extrusion layer for covering segments of the second co-extrusion layer that are visible from an exterior of the vehicle.

Accordingly, the sealing member includes a third co-extrusion layer which provides a uniform appearance when viewed from an exterior of the vehicle. In addition, the sealing member can be color matched with corner and end molds and other parts of a window seal assembly. The third co-extrusion layer, which is formed from a thermoplastic vulcanizate composition which has excellent weatherability characteristics, i.e., is resistant to fading or discoloration after exposure to various environmental conditions. Further, the sealing member can be extruded in a cost-effective, in-line extrusion process which can eliminate the need to spray coat the sealing member to provide a uniform appearance when viewed from an exterior of the vehicle.

BRIEF DESCRIPTION OF THE DRAWINGS

Other advantages of the present invention will be readily appreciated, as the same becomes better understood by reference to the following detailed description when considered in connection with the accompanying drawings.

DETAILED DESCRIPTION OF THE INVENTION

Referring to the Figures, wherein like numerals indicate corresponding parts throughout the several views, a window seal assembly is shown generally at 10.

Figure 1:
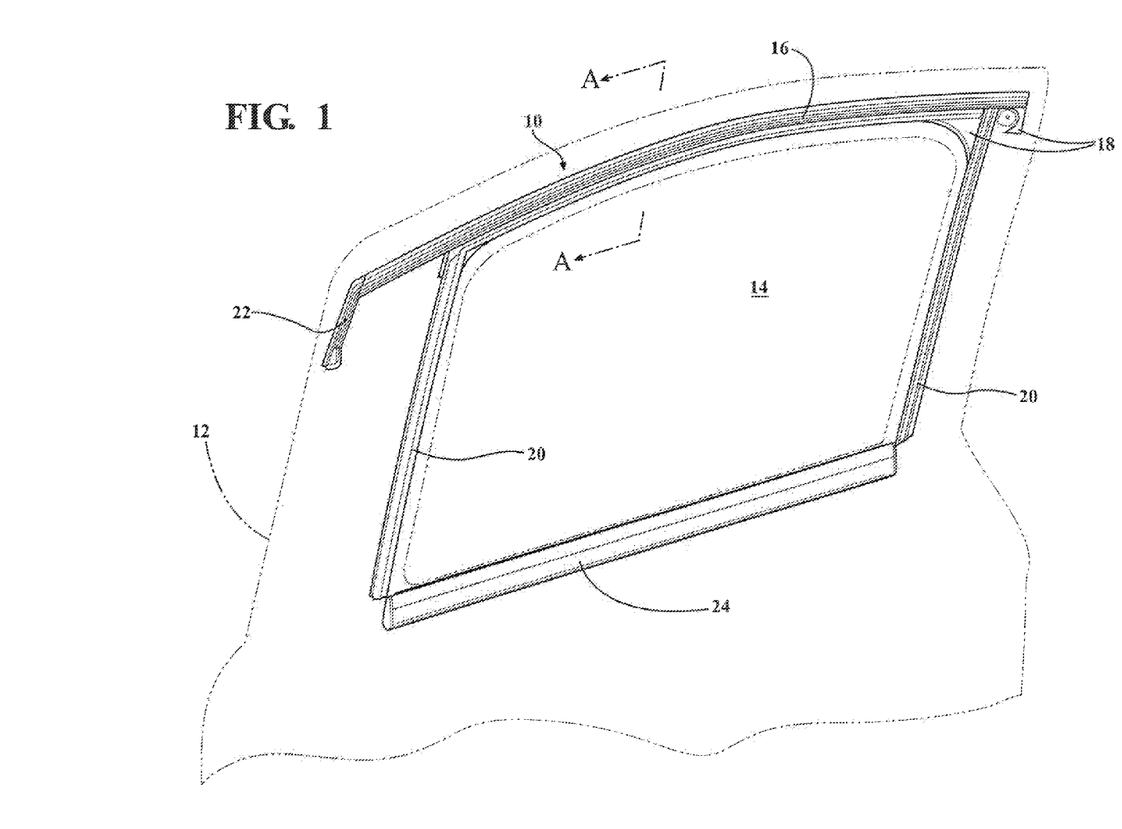
FIG. 1 is an exterior view of a window seal assembly including a sealing member for a vehicle door.

FIG. 1 is an exterior view of vehicle door 12 which includes a window 14 which is movable in a vertical direction and a window seal assembly 10. The window 14 is slidably received in vertical guide tracks in the vehicle door 12. When the window 14 is closed, its edges are adapted to be received within and engaged by the window seal assembly 10. The window seal assembly 10 functions to secure the window 14 to the vehicle door 12 when the vehicle is traveling, to provide a seal between the window 14 and vehicle door 12, to enhance vehicle acoustics, and to provide an aesthetically pleasing appearance when viewed from an exterior of the vehicle.

The window seal assembly 10 shown in FIG. 1 comprises a number of sealing members. Specifically, the window seal assembly 10 typically includes one or more sealing members such as a sealing member 16 (in this example a header profile), molds 18, pillar profiles 20, margin profiles 22, and a belt-line profile 24. The sealing member 16, molds 18, pillar profiles 20, margin profiles 22, and belt-line profile 24 typically have an outermost layer which is formed from a thermoplastic vulcanizate (TPV) composition and visible from an exterior of the vehicle.

It is to be appreciated that the window seal assembly 10 and sealing members thereof may be utilized for sealing trunk openings, door openings, and sunroof openings of the vehicle. It should also be appreciated that the window seal assembly 10 and sealing members thereof may be used for other purposes that are not specifically related to vehicles and are not described herein.

Figure 2:
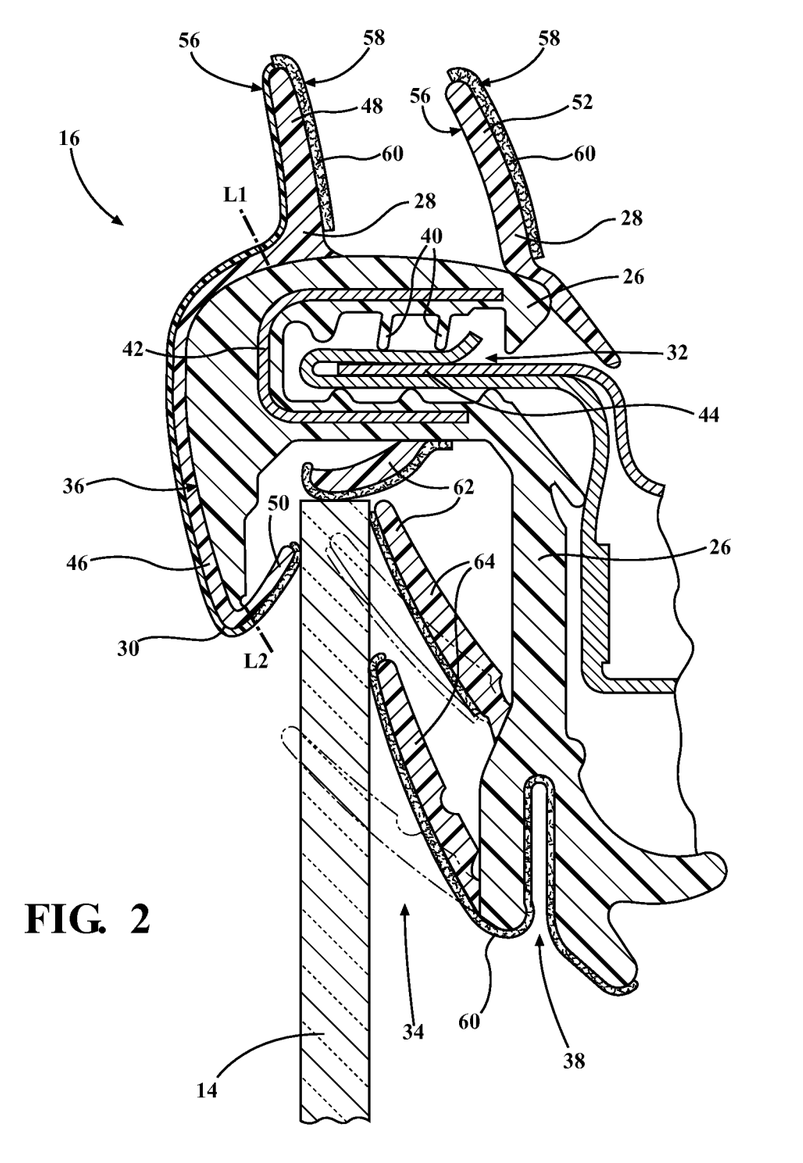
FIG. 2 is a cross-sectional view of a first embodiment of the sealing member taken along line A-A in FIG. 1.

Referring to FIG. 2, a cross-sectional view of a first embodiment of the sealing member 16 of the window seal assembly 10 is shown. The sealing member 16 includes a first co-extrusion layer 26 formed from a first elastomeric composition, a second co-extrusion layer 28 formed from a second elastomeric composition, and a third co-extrusion layer 30 formed from the TPV composition.

The first co-extrusion layer 26 defines a mounting channel 32, a window channel 34, and a front face 36 spaced from the mounting channel 32 and the window channel 34. In a typical embodiment, the front face 36 is substantially parallel to window channel 34 and extends from a first reference line L1 to second reference line L2. The window channel 34 is adjacent to the mounting channel 32. Further, the first co-extrusion layer 26 defines a bottom channel 38 adjacent and substantially parallel to the window channel 34.

The mounting channel 32 contains a plurality of gripping fins 40 for holding and securing the sealing member 16 to the vehicle door 12. The plurality of gripping fins 40 can be any desired quantity of gripping fins 40 or in any configuration for holding and securing the vehicle door.

The first co-extrusion layer 26 further includes a reinforcing member 42 disposed adjacent to the gripping fins 40 for reinforcing the mounting channel 32. The reinforcing member 42 is typically formed from a metal. Preferably, the reinforcing member 42 is formed from steel, e.g. a carbon steel, an alloy steel, a stainless steel, a tool steel, or a coated steel. For example, the reinforcing member 42 can be formed from an electro-galvanized steel or a mild steel. Alternatively, the reinforcing member 42 can be formed from an aluminum alloy. It should be appreciated that the reinforcing member 42 can formed from materials not described herein which are capable of providing the rigidity to grasp the mounting flange 44 of the door 12 to mount the sealing member 16 on the door 12.

The first co-extrusion layer 26 is formed from the first elastomeric composition. The first elastomeric composition includes an elastomer and can also include plasticizer, filler, and various other components and additives. In a preferred embodiment, the first elastomeric composition comprises ethylene propylene diene monomer ("EPDM"). However, it is to be appreciated that the first elastomeric composition can comprise elastomers other than EPDM such as styrene butadiene rubber ("SBR"), natural rubber, neoprene, and combinations thereof. It should also be appreciated that the first elastomeric composition can comprise thermoplastic or thermosetting materials not specifically described herein.

The first elastomeric composition typically has a Shore A Hardness of from 65 to 100 and more typically from 80 to 90, when tested in accordance with ASTM D2240. Further, the first elastomeric composition typically has a specific gravity of from 1.2 to 1.6 and more typically from 1.3 to 1.5, g/cm$^3$.

The second co-extrusion layer 28 has a portion 46 disposed on the front face 36 of the first co-extrusion layer 26 (extending from L1 to L2) and a sealing lip 48 disposed on the first co-extrusion layer 26 abutting the portion 46 and extending away from the first co-extrusion layer 26 towards a distal end. The front face 36 typically defines the length of the portion 46. The portion 46 may also include an exterior lip 50 extending into the window channel 34 of the first co-extrusion layer 26.

The second co-extrusion layer 28 may further include a second sealing lip 52 extending away from the first co-extrusion layer 26 towards a distal end. The second sealing lip 52 may have a tail which extends away from the distal end. When the second co-extrusion layer 28 includes a second sealing lip 52, the sealing lip 48 is further defined as the first sealing lip 48 and the first and the second sealing lips 48, 52 are spaced from one another for creating a seal against the door 12. In one embodiment, the first sealing lip 48 and the second sealing lip 52 are substantially parallel to one another for creating a seal against the door 12.

The first sealing lip 48 and second sealing lip 52 both contain an interior facing surface 56 and an exterior facing surface 58. A flocking material 60 covers the interior facing surface 56 of the first and second sealing lips 48, 52 for reducing the friction between the first and second sealing lips 48, 52 and the door 12. The flocking material 60 is also disposed on the first co-extrusion layer 26 adjacent to and within the bottom channel 38. The flocking material 60 is typically used on multiple surfaces of the sealing member 16 and typically comprises polyethylene. However, it is to be appreciated any low friction material could also be used on the interior facing surfaces 56 and first co-extrusion layer 26.

The second co-extrusion layer 28 further includes a second portion 62 disposed within the window channel 34 of the first co-extrusion layer 26. The second portion 62 includes a plurality of interior lips 64 for sealing and guiding the window. In one embodiment, the interior lips 64 include an apex to define a generally V-shaped cross sectional shape along a longitudinal axis for sealing and guiding the window 12. The interior lips 64 are disposed opposite the exterior lip 50 of the first portion 46 for sealing against an interior surface and exterior surface of the window 12, respectively. The plurality of interior lips 64 can be any desired quantity of interior lips 64 or in any configuration for sealing and guiding the window. Furthermore each of the interior lips 64 and the exterior lip 50 are typically coated with the flocking material 60 or another low friction material.

The second co-extrusion layer 28 is formed from the second elastomeric composition. The second elastomeric composition includes an elastomer and can also include plasticizer, filler, and various other components and additives. In a preferred embodiment, the second elastomeric composition comprises EPDM. However, it is to be appreciated that the second elastomeric composition can comprise elastomers other than EPDM such as SBR, natural rubber, neoprene, and combinations thereof. It is should also be appreciated that the second elastomeric composition can comprise thermoplastic or thermosetting materials not specifically described herein.

The second elastomeric composition and is typically softer and more flexible than the first elastomeric composition. Specifically, the second elastomeric composition exhibits excellent compression set. The second elastomeric composition typically has a Shore A Hardness of from 40 to 80 and more typically from 50 to 60, when tested in accordance with ASTM D2240. Further, the second elastomeric composition typically has a specific gravity of from 1.1 to 1.5 and more typically from 1.3 to 1.4, g/cm$^3$.

The third co-extrusion layer 30 is disposed on the portion 46 and the sealing lip 48 of the second co-extrusion layer 28 for covering segments of the second co-extrusion layer 28 that are visible from an exterior of the vehicle. Specifically, the third co-extrusion layer 30 extends from the distal end of the front face 22 (L2) to the distal end of the first sealing lip 32. As such, the third co-extrusion layer 30 covers all portions of the sealing member 16 which are visible to an observer to achieve a uniform color appearance. The subject invention therefore eliminates the common production step of spray applying a coating to these visible surfaces.

The third co-extrusion layer 30 typically has a thickness greater than 0.1, alternatively from 0.1 to 4, alternatively from 0.5 to 2, mm. As such, the third co-extrusion layer 30 is also durable.

In the first embodiment, the placement of the third co-extrusion layer 30 on the sealing member 16, results in the sealing member 16 having two sealing lips, where the first sealing lip 48 is formed from the second elastomeric composition and the TPV composition, i.e., the second co-extrusion layer 28 and the third co-extrusion layer 30, and the second sealing lip 52 is formed from the second elastomeric composition, i.e., the second co-extrusion layer 28.

The thermoplastic TPV composition comprises an elastomer and also a thermoplastic. Suitable non-limiting examples of elastomers which may be included in the TPV composition are EPDM, styrene butadiene rubber, natural rubber, neoprene, and combinations thereof. In a preferred embodiment the TPV composition comprises EPDM. Suitable thermoplastics include acrylonitrile butadiene styrenes, acrylics, celluloids, cellulose acetates, cycloolefin copolymers, ethylene-vinyl acetates, ethylene vinyl alcohols, fluoropolymers, ionomers, liquid crystal polymers, polyacetals, polyacrylates, polyacrylonitriles, polyamides, polyamideimides, polyaryletherketones, polybutadienes, polybutylenes, polybutylene terephthalates, polycaprolactones, polychlorotrifluoroethylenes, polyethylene terephthalates, polycyclohexylene dimethylene terephthalates, polycarbonates, polyhydroxyalkanoates, polyketones, polyesters, polyethylenes, polyetheretherketones, polyetherimides, polysulfones, polyethylenechlorinates, polyimides, polylactic acids, polymethylpentenes, polyphenylene oxides, polyphenylene sulfides, polyphthalamides, polypropylenes, polystyrenes, polysulfones, polytrimethylene terephthalates, polyurethanes, polyvinyl acetates, polyvinyl chlorides, polyvinylidene chlorides, styrene-acrylonitriles, and combinations thereof. The TPV composition typically comprises greater than 5, alternatively greater than 10, alternatively greater than 15, parts by weight thermoplastic material, based on 100 parts by of the TPV composition. In a preferred embodiment, the TPV composition comprises a thermoplastic material selected from the group of polypropylene, polyethylene, ethylene vinyl acetate ("EVA"), and combinations thereof. Of course, the TPV composition can include plasticizer, filler, and various other components and additives.

In a preferred embodiment, the TPV composition comprises EPDM and polypropylene. However, it is to be appreciated that the TPV composition can comprise elastomers other than EPDM such as SBR, natural rubber, neoprene, and combinations thereof, and thermoplastics other than polypropylene such as polyethylene and EVA. It should also be appreciated that the TPV composition can comprise elastomeric and thermoplastic materials not specifically described herein.

The TPV composition typically has a Shore A Hardness of from 65 to 100 and more typically from 70 to 80, when tested in accordance with ASTM D2240. Further, the TPV composition typically has a specific gravity of from 0.9 to 1.5 and more typically from 0.95 to 1.2, g/cm$^3$. As alluded to above the, the TPV composition is UV stable and exhibits minimal discoloration after cycling in a xenon arc weatherometer.

Figure 3:
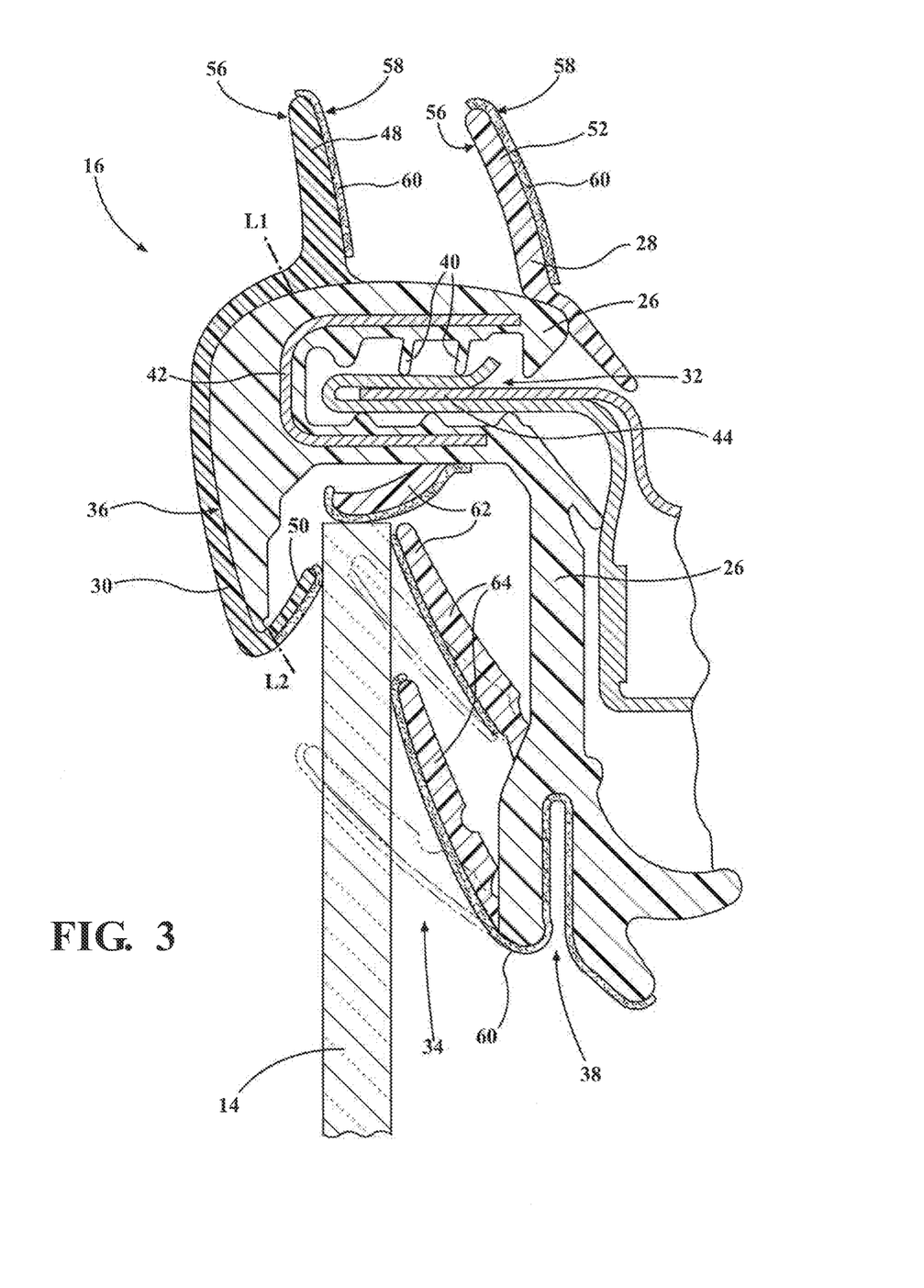
FIG. 3 is a cross-sectional view of a second embodiment of the sealing member of a window seal assembly such as that of FIG. 1, along a line such as line A-A of FIG. 1.

Referring to FIG. 3, a cross-sectional view of a second embodiment of the sealing member 16 of the window seal assembly 10 is shown. The sealing member 16 of this embodiment also includes the first co-extrusion layer 26 formed from the first elastomeric composition, the second co-extrusion layer 28 formed from the second elastomeric composition, and the third co-extrusion layer 30 formed from the TPV composition. The third co-extrusion layer has a face portion disposed on said front face of said first co-extrusion layer (extending from L1 to L2) for covering segments of first co-extrusion layer that are visible from an exterior of the vehicle. In this embodiment, the first sealing lip 48 is formed from the TPV composition, i.e., the third co-extrusion layer 30 and disposed on the first co-extrusion layer 26 abutting the face portion and extending away from the first co-extrusion layer 26 towards a distal end.

In contrast to the first embodiment, in this second embodiment the placement of the third co-extrusion layer 30 on the sealing member 16, results in the sealing member 16 having two sealing lips, where the first sealing lip 48 is formed entirely from the TPV composition, i.e., the third co-extrusion layer 30, and the second sealing lip 52 is formed exclusively from the second elastomeric composition, i.e., the second co-extrusion layer 28.

Figure 4A:
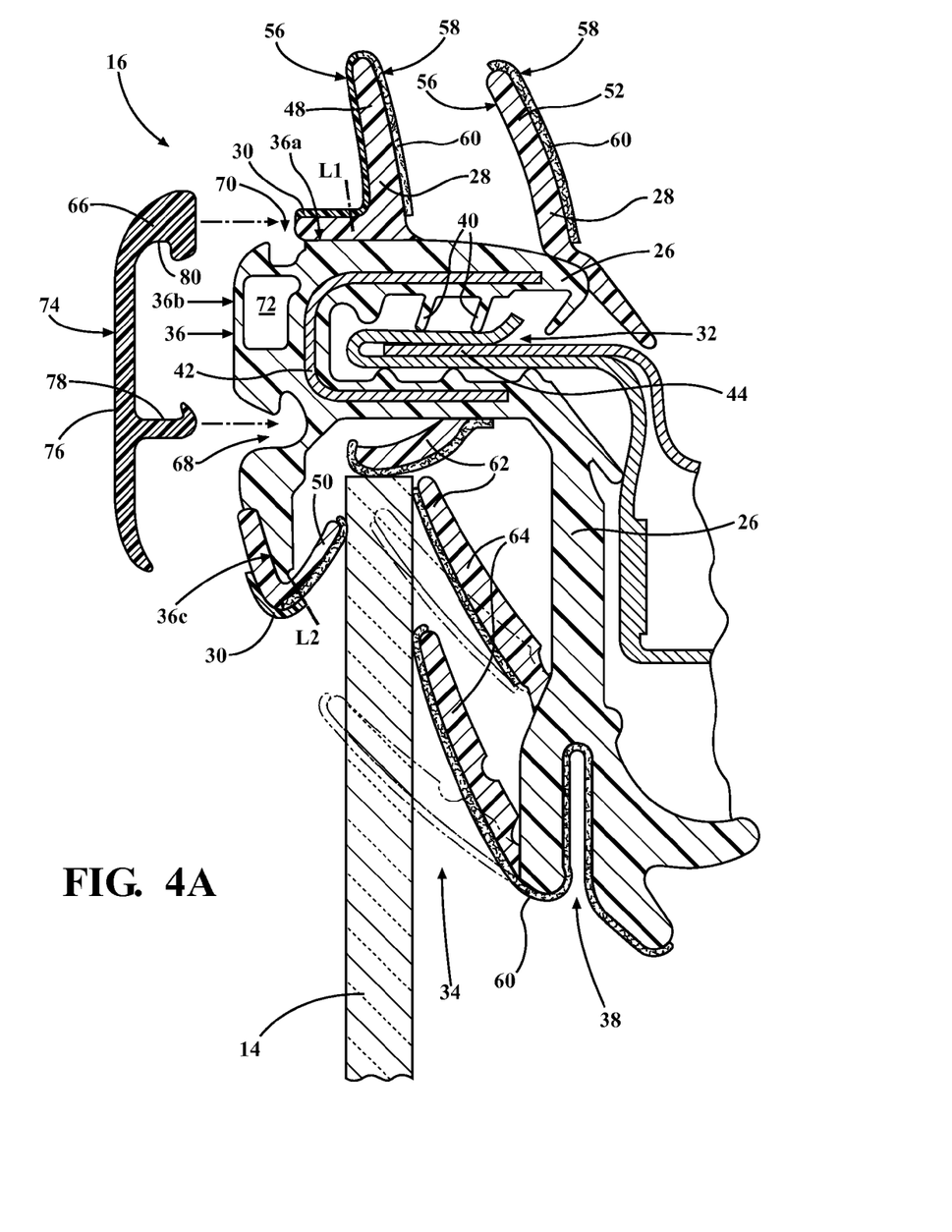
FIG. 4A is a cross-sectional view of a third embodiment of the sealing member of a window seal assembly such as that of FIG. 1, along a line such as line A-A of FIG. 1, said sealing member including a trim member shown spaced from the sealing member.
Figure 4B:
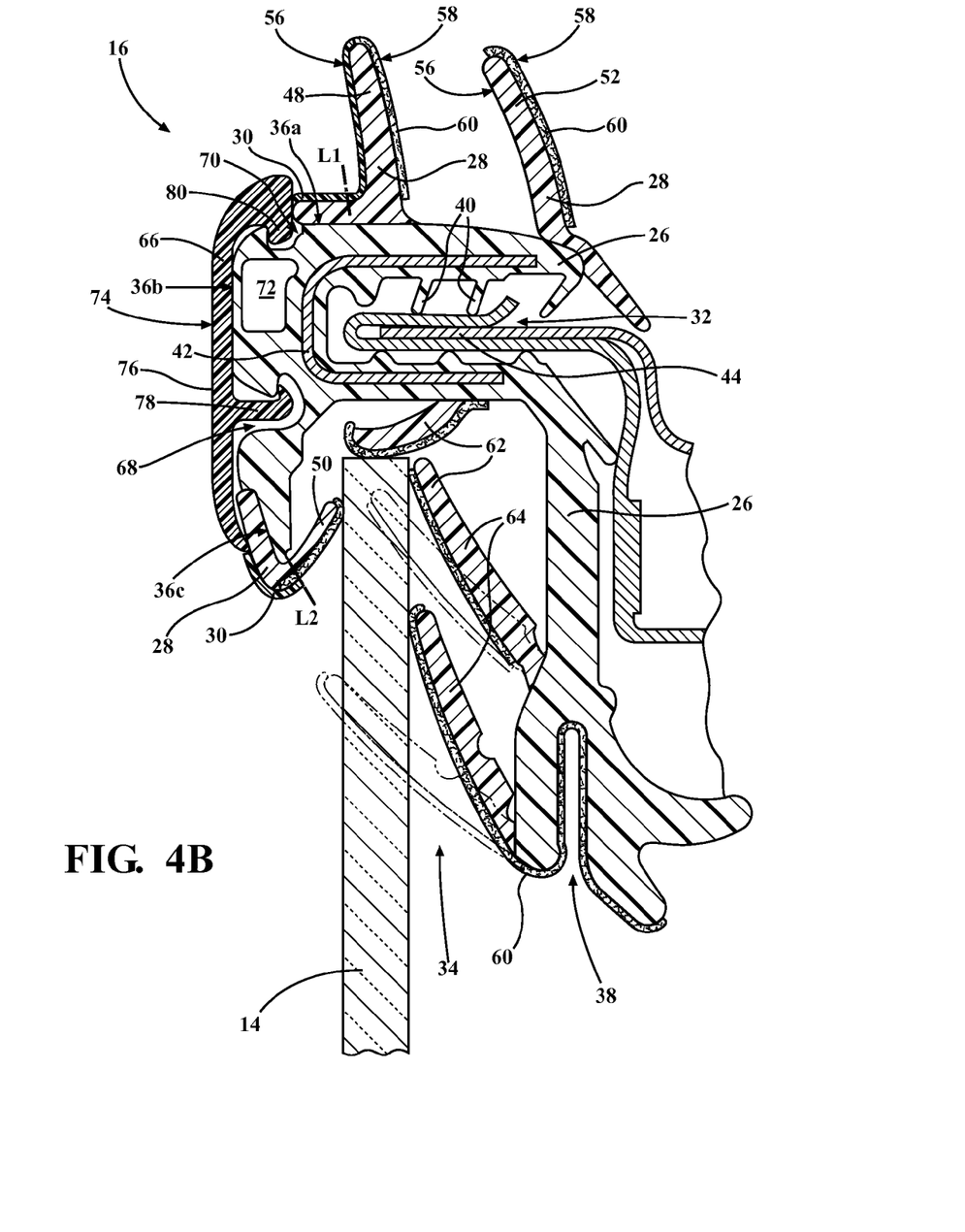
FIG. 4B is a cross-sectional view of the sealing member of FIG. 4A showing the trim member coupled to the sealing member.

Referring to FIGS. 4A and 4B, a cross-sectional view of a third embodiment of the sealing member 16 of the window seal assembly 10 is shown. The third embodiment of the sealing member 16 can minimize the need for molds and result in an improved aesthetic appearance as well as enhanced window sealing. The trim member 66 can having various finishes such as low gloss black, high gloss black, and chrome.

The sealing member 16 of the third embodiment includes the first co-extrusion layer 26 formed from the first elastomeric composition, the second co-extrusion layer 28 formed from the second elastomeric composition, and the third co-extrusion layer 30 formed from the TPV composition. Of course, the first co-extrusion layer 26 of this embodiment defines the mounting channel 32, the window channel 34, the front face 36 spaced from the mounting channel 32, and the window channel 34. The first co-extrusion layer 26 of this third embodiment defines at least one channel for receiving the trim member 66. In one specific embodiment, the at least one channel is further defined as a pair of spaced channels, 68, 70 dividing said front face 36 into an upper portion 36a, a central portion 36b, and a lower portion 36c, with said second co-extrusion layer 28 only formed on a portion of said upper and lower portions 36a, 36c. As such, the third co-extrusion layer 30 covers segments of the first co-extrusion layer 26 that are visible from an exterior of the vehicle. Said differently, the first channel 68 dissects the front face 36 and the second channel 70 is adjacent to the first sealing lip 48.

In this embodiment, the first co-extrusion layer 26 also optionally defines a cavity 72 adjacent to the front face 36.

In this embodiment, the trim member 66 which has a front face 74, a main body 76, and a first and a second stem 78, 80, received within the channels 68, 70 of the sealing member 16. More specifically, the first and second stem 78, 80 are received within the channels 68, 70 to secure the trim member 66 to the sealing member 16. FIG. 4A is a cross-sectional view of a third embodiment of the sealing member 16 with the trim member 66 shown spaced from the sealing member 16 whereas FIG. 4B is a cross-sectional view of the sealing member 16 of FIG. 4A showing the trim member 66 coupled to the sealing member 16.

A method of forming the sealing member 16 of the subject invention is also disclosed. The method includes the steps of co-extruding the first elastomeric composition to form the first co-extrusion layer 26, co-extruding the second elastomeric composition to form the second co-extrusion layer 28, and co-extruding the TPV composition to form the third co-extrusion layer 30.

In one embodiment of the method, the steps of co-extruding the first elastomeric composition to form the first co-extrusion layer 26 and co-extruding the second elastomeric composition to form the second co-extrusion layer 28 are conducted simultaneously. This embodiment also typically includes the step of heating the first and second co-extrusion layers 26, 28 to cure the first and second elastomeric compositions prior to co-extruding the TPV composition to form the third co-extrusion layer 30. Once cured, the first and second co-extrusion layers 26, 28 are optionally cooled. Further, the extrudite comprising the first and second co-extrusion layers 26, 28 is optionally fed through a flocking booth where flocking is applied. The step of co-extruding the TPV composition to form the third co-extrusion layer 30 is conducted subsequent to the co-extrusion of the first and second co-extrusion layers.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

The invention claimed is:

1. A sealing member for a vehicle opening comprising:
a first co-extrusion layer defining a mounting channel, a window channel, and a front face spaced from said mounting channel and said window channel, said first co-extrusion layer formed from a first elastomeric composition;
a second co-extrusion layer having a portion disposed on said front face of said first co-extrusion layer and a sealing lip disposed on said first co-extrusion layer abutting said portion and extending away from said first co-extrusion layer towards a distal end, said second co-extrusion layer formed from a second elastomeric composition which is different than said first elastomeric composition; and
a third co-extrusion layer disposed on said portion and said sealing lip of said second co-extrusion layer for covering segments of said second co-extrusion layer that are visible from an exterior of the vehicle, said third co-extrusion layer formed from a thermoplastic vulcanizate composition which is different than said first and second elastomeric compositions.

2. A sealing member as set forth in claim 1 whereby said sealing lip is further defined as a first sealing lip and wherein said second co-extrusion layer includes a second sealing lip extending away from said first co-extrusion layer towards a distal end wherein said first sealing lip and said second sealing lip are spaced from one another for creating a seal against the vehicle.

3. A sealing member as set forth in claim 1 wherein said first sealing lip and said second sealing lip are substantially parallel to one another for creating a seal against the vehicle.

4. A sealing member as set forth in claim 1 wherein said front face is substantially parallel to said window channel.

5. A sealing member as set forth in claim 1 wherein said portion has an exterior lip extending into said window channel of said first co-extrusion layer.

6. A sealing member as set forth in claim 1 wherein said front face defines a length of said portion.

7. A sealing member as set forth in claim 1 wherein said thermoplastic vulcanizate composition comprises a thermoplastic material chosen from polypropylene, polyethylene, ethylene vinyl acetate, and combinations thereof.

8. A sealing member as set forth in claim 7 wherein said thermoplastic vulcanizate composition comprises greater than 5 parts by weight of said thermoplastic material, based on 100 parts by weight of said thermoplastic vulcanizate composition.

9. A sealing member as set forth in claim 7 wherein said thermoplastic vulcanizate composition also comprises ethylene propylene diene monomer.

10. A sealing member as set forth in claim 1 wherein said third co-extrusion layer has a thickness of from 0.1 to 4 mm.

11. A sealing member as set forth in claim 1 wherein said second co-extrusion layer further includes a second portion disposed within said window channel of said first co-extrusion layer.

12. A sealing member as set forth in claim 1 wherein said second co-extrusion layer further includes a second portion disposed within said window channel of said first co-extrusion layer and wherein said second portion has a plurality of interior lips for sealing and guiding a window.

13. A sealing member as set forth in claim 1 wherein said first co-extrusion layer further includes a C-shaped reinforcing member for reinforcing said mounting channel.

14. A sealing member as set forth in claim 1 wherein said first co-extrusion layer further defines at least one channel for receiving a trim member.

15. A sealing member as set forth in claim 14 wherein said at least one channel is further defined as a pair of spaced channels dividing said front face into an upper portion, a central portion, and a lower portion, with said second co-extrusion layer only formed on a portion of said upper and lower portions.

16. A sealing member for a vehicle opening comprising:
a first co-extrusion layer defining a mounting channel, a window channel, and a front face spaced from said mounting channel and said window channel, said first co-extrusion layer formed from a first elastomeric composition;
a second co-extrusion layer disposed on said first co-extrusion layer and having a second sealing lip extending away from said first co-extrusion layer towards a distal end, said second co-extrusion layer formed from a second elastomeric composition which is different than said first elastomeric composition; and
a third co-extrusion layer having a portion disposed on said front face of said first co-extrusion layer for covering segments of first co-extrusion layer that are visible from an exterior of the vehicle, with said third co-extrusion layer having a first sealing lip disposed on said first co-extrusion layer abutting said portion and extending away from said first co-extrusion layer towards a distal end, said first sealing lip spaced from said second sealing lip for creating a seal against the vehicle, said third co-extrusion layer formed from a thermoplastic vulcanizate composition which is different than said first and second elastomeric compositions.

17. A sealing member as set forth in claim 16 wherein said first sealing lip and said second sealing lip are substantially parallel to one another for creating a seal against the vehicle.

18. A sealing member as set forth in claim 16 wherein said front face is substantially parallel to said window channel.

19. A sealing member as set forth in claim 16 wherein said portion has an exterior lip extending into said window channel of said first co-extrusion layer.

20. A sealing member as set forth in claim 16 wherein said front face defines a length of the third co-extrusion layer.

21. A sealing member as set forth in claim 16 wherein said thermoplastic vulcanizate composition comprises a thermoplastic material chosen from polypropylene, polyethylene, ethylene vinyl acetate, and combinations thereof.

22. A sealing member as set forth in claim 21 wherein said thermoplastic vulcanizate composition comprises greater than 5 parts by weight of said thermoplastic material, based on 100 parts by weight of said thermoplastic vulcanizate composition.

23. A sealing member as set forth in claim 16 wherein said thermoplastic vulcanizate composition also comprises ethylene propylene diene monomer.

24. A sealing member as set forth in claim 16 wherein said third co-extrusion layer has a thickness of from 0.1 to 4 mm.

25. A sealing member as set forth in claim 16 wherein said second co-extrusion layer further includes a second portion disposed within said window channel of said first co-extrusion layer and wherein said second portion has a plurality of interior lips for sealing and guiding a window.

26. A sealing member as set forth in claim 16 wherein said first co-extrusion layer further includes a C-shaped reinforcing member for reinforcing said mounting channel.

27. A method of forming a glass run sealing member comprising a first co-extrusion layer, a second co-extrusion layer, and a third co- extrusion layer, said method comprising the steps of:
co-extruding a first elastomeric composition to form the first co-extrusion layer, the first co-extrusion layer defining a mounting channel, a window channel, and a front face spaced from the mounting channel and the window channel;
co-extruding a second elastomeric composition, which is different than the first elastomeric composition, to form the second co-extrusion layer on the first co-extrusion layer, the second co-extrusion layer having a portion disposed on the front face of the first co-extrusion layer and a sealing lip disposed on the first co-extrusion layer abutting the portion and extending away from the first co-extrusion layer towards a distal end; and
co-extruding a thermoplastic vulcanizate composition, which is different than the first and second elastomeric compositions, to form the third co-extrusion layer on the second co-extrusion layer, the third co-extrusion layer disposed on the portion and the sealing lip of the second co-extrusion layer for covering segments of the second co-extrusion layer that are visible from an exterior of the vehicle.

28. A method as set forth in claim 27 wherein the steps of co-extruding the first elastomeric composition to form the first co-extrusion layer and co-extruding the second elastomeric composition to form the second co-extrusion layer are conducted simultaneously.

29. A method as set forth in claim 27 wherein the step of co-extruding the thermoplastic vulcanizate composition to form the third co-extrusion layer is conducted subsequent to the co-extrusion of the first and second co-extrusion layers.

30. A method as set forth in claim 27 further comprising the step of heating the first and second co-extrusion layers to cure the first and second elastomeric compositions prior to co-extruding the thermoplastic vulcanizate composition to form the third co-extrusion layer.

* * * * *